(12) United States Patent
Brink et al.

(10) Patent No.: US 12,393,893 B2
(45) Date of Patent: *Aug. 19, 2025

(54) METHOD AND A CONTROL ARRANGEMENT FOR ADJUSTING A CLEANING SCHEDULE FOR CLEANING SESSIONS OF A SCRAPER ARRANGEMENT

(71) Applicant: DELAVAL HOLDING AB, Tumba (SE)

(72) Inventors: Marek Brink, Tumba (SE); Józef Furdak, Tumba (SE); Piotr Hofman, Tumba (SE); Bartlomiej Jaklik, Tumba (SE); Bartlomiej Slusarczyk, Tumba (SE)

(73) Assignee: DeLaval Holding AB, Tumba (SE)

( * ) Notice: Subject to any disclaimer, the term of this patent is extended or adjusted under 35 U.S.C. 154(b) by 539 days.

This patent is subject to a terminal disclaimer.

(21) Appl. No.: 17/772,741

(22) PCT Filed: Nov. 24, 2020

(86) PCT No.: PCT/SE2020/051116
§ 371 (c)(1),
(2) Date: Apr. 28, 2022

(87) PCT Pub. No.: WO2021/107839
PCT Pub. Date: Jun. 3, 2021

(65) Prior Publication Data
US 2022/0378009 A1 Dec. 1, 2022

(30) Foreign Application Priority Data
Nov. 28, 2019 (SE) .................................. 1951366-2

(51) Int. Cl.
*G06Q 10/0631* (2023.01)
*A01K 1/01* (2006.01)

(52) U.S. Cl.
CPC ..... *G06Q 10/06312* (2013.01); *A01K 1/0132* (2013.01)

(58) Field of Classification Search
CPC .................. G06Q 10/06312; A01K 1/0132
See application file for complete search history.

(56) References Cited

U.S. PATENT DOCUMENTS

2019/0166788 A1* 6/2019 Xu ...................... A01K 1/0146

FOREIGN PATENT DOCUMENTS

| CN | 103983216 | 8/2014 |
|---|---|---|
| CN | 106342699 | 1/2017 |

(Continued)

OTHER PUBLICATIONS

Combining a Novel Computer Vision Sensor with a Cleaning Robot to Achieve Autonomous Pig House Cleaning; Andersen et al.; 2005 (Year: 2005).*

(Continued)

*Primary Examiner* — Deirdre D Hatcher
(74) *Attorney, Agent, or Firm* — NIXON & VANDERHYE

(57) ABSTRACT

A method for adjusting a cleaning schedule for cleaning sessions of a scraper arrangement (1) arranged for removing manure in a livestock area. One cleaning session comprises one cleaning along a predefined path in the livestock area. The method comprises monitoring (S2), while performing cleaning sessions in accordance with the cleaning schedule, a load quantity representing an amount of material moved by the scraper arrangement (1). The method also comprises adjusting (S5) the cleaning schedule, based on a variation in the monitored load quantity among the monitored cleaning sessions. The disclosure also relates to a control arrangement (10).

19 Claims, 6 Drawing Sheets

(56) References Cited

FOREIGN PATENT DOCUMENTS

| | | |
|---|---|---|
| CN | 109526761 | 3/2019 |
| EP | 2 731 420 | 5/2014 |
| EP | 3 000 316 | 3/2016 |
| WO | WO-2011062481 A1 * | 5/2011 |
| WO | 2013/010785 | 1/2013 |
| WO | 2019/160480 | 8/2019 |

OTHER PUBLICATIONS

Search Report for SE Application No. 1951366-2 dated Jun. 11, 2020, 2 pages.
International Search Report for PCT/SE2020/051116 dated Feb. 26, 2021, 4 pages.
Written Opinion of the ISA for PCT/SE2020/051116 dated Feb. 26, 2021, 8 pages.

* cited by examiner

METHOD AND A CONTROL ARRANGEMENT FOR ADJUSTING A CLEANING SCHEDULE FOR CLEANING SESSIONS OF A SCRAPER ARRANGEMENT

This application is the U.S. national phase of International Application No. PCT/SE2020/051116 filed Nov. 24, 2020 which designated the U.S. and claims priority to SE Patent Application No. 1951366-2 filed Nov. 28, 2019, the entire contents of each of which are hereby incorporated by reference.

TECHNICAL FIELD

The present disclosure relates to cleaning in livestock areas, and in particular removing manure along a predefined path in a livestock area, such as a dairy barn.

BACKGROUND

It is important that a livestock environment is kept clean. A livestock environment comprises for example a freestall barn where animals are free to walk around, or a tie stallbarn where the animals are tied up. A clean livestock area in the livestock environment reduces hoof problems to animals staying in the area, thereby reducing veterinary costs. A clean livestock area also reduces general contamination of the animals, and clean animals reduce milking preparation time.

Animals (such as cows or other dairy animals) located in a livestock area continuously add manure that should be removed in order to keep the livestock area clean. The manure is usually deposited in an alley. The manure may be collected using a scraper. The scraper then moves along the length of the alley and deposits the manure in a reception pit or tank at the end. If the floor along the alley is slatted, the manure is collected in a gutter under the slatted floor. The scraper then moves the manure from the floor to the gutter via the slats. Stalls for the animals may be located on the sides of the alley.

The alley is typically cleaned according to a fixed time schedule that may start automatically or be triggered by a user. The time between the cleaning sessions is typically set to a fixed value. However, the amount of manure in the livestock area differs during the day and may also increase or decrease depending on the total number of animals present. Thereby, the alleys may sometimes be cleaned too rarely because a lot of manure is accumulated in the alley during a relatively short period of time. This may cause a poor environment for the animals. If the alley is cleaned too often, the power consumption may be increased, and manure equipment wear out earlier. Too frequent cleaning may also cause stress to the animals, with a reduced milk production as a result.

In WO2019/160480A2 a method and arrangement for manure handling is described. The operation of a manure scrape is here controlled based on information obtained from one or more cameras mounted to capture images of the area of operation of the scraper. If much manure is observed by the one or more cameras, the manure scraper can be activated.

SUMMARY

It is desired to provide manure removal that is efficient, and to reduce time a user has to spend on manure removal. It is also desired to reduce operational costs for equipment that removes the manure.

It is thus an objective of the disclosure to provide a method for efficient removal of manure. It is a further objective to provide a method that reduces costs for removing the manure. It is a still further objective to reduce the time a user must spend in order to have the manure removed.

These objectives and others are at least partly achieved by the method and the control arrangement according to the independent claims, and by the embodiments according to the dependent claims.

According to a first aspect, the disclosure relates to a method for adjusting a cleaning schedule for cleaning sessions of a scraper arrangement arranged for removing manure in a livestock area. One cleaning session comprises one cleaning along a predefined path in the livestock area. The method comprises monitoring, while performing cleaning sessions in accordance with the cleaning schedule, a load quantity representing an amount of material moved by the scraper arrangement and adjusting the cleaning schedule, based on a variation in the monitored load quantity among the monitored cleaning sessions.

The method provides a way to generate an adjusted cleaning schedule for cleaning the predefined path, which schedule is adjusted based on previous performed cleaning sessions. Thereby, an optimized cleaning schedule can be obtained, that for example includes more cleaning during time periods when there is a lot of material along the predefined path, and less cleaning when there is less material along the predefined path. The method may be performed autonomously with little human attention required, thus reducing human action otherwise required. Hence, the user does not have to optimize the cleaning schedule. If there are changes in the livestock area, for example more animals or less animals than before that changes the amount of delivered manure, the method may automatically find out that there is a change of the load to the scraper arrangement and adjust the cleaning schedule accordingly. As a result, the power consumption and/or the mechanical wear of the cleaning device may also be minimized through adapting to the local working conditions. The influence and/or disturbance the scraper arrangement causes to the animals may also be reduced.

According to some embodiments, the method comprises obtaining an initial cleaning schedule, and wherein the monitoring comprises monitoring the load quantity while performing cleaning sessions in accordance with the initial cleaning schedule. Thus, some initial cleaning sessions may be performed to provide data for machine learning.

According to some embodiments, the monitoring comprises monitoring the load quantity while performing cleaning sessions in accordance with the adjusted cleaning schedule. Thus, the cleaning schedule may continuously be adjusted using monitored load quantities from the latest adjusted cleaning schedule(s).

According to some embodiments, the adjusting comprises adjusting the cleaning schedule, such that the variation in the monitored load quantity among the individual cleaning sessions is reduced. Thus, it is desired to even out variations in the load, such that the load is more or less the same at all cleaning sessions in a cleaning schedule. Hence, the maximum amount of material accumulated in individual cleaning sessions is typically reduced. Thereby excessive high loads to the scraper arrangement can be obviated, that otherwise might cause wear to the scraper arrangement. Since peak loads thus may be reduced, the system may be designed thereafter, with a resulting lower total cost. Also, cleaning will only be performed when considered needed, thus, during time periods with low amounts of manure the predefined path will be cleaned less times. Thereby, the animals will be disturbed less.

According to some embodiments, the adjusting comprises adjusting the cleaning schedule, such that the monitored load quantity stays below or at a predetermined load threshold during all the cleaning sessions. Thereby a certain cleanliness level can be ascertained. As the load quantity will never go above the predetermined load threshold, wear to the scraper arrangement will be reduced.

According to some embodiments, the variation represents a variation among load quantities monitored during different cleaning sessions within one time period. According to some embodiments, the variation represents average variation for a plurality of previous time periods. According to some embodiments, the time period is one day.

According to some embodiments, the adjusting comprises adjusting the cleaning schedule, such that during one time period, cleaning is performed more frequently during a first time interval corresponding to a first average load, than during a second time interval corresponding to a second average load, wherein the first average load is greater than the second average load. Thereby the variation in the load quantity may be mitigated, and even reduced.

According to some embodiments, the method comprises estimating, based on the monitored load quantity, a material accumulation rate pattern representing a material accumulation rate along the predefined path, and wherein adjusting the cleaning schedule is based on the estimated material accumulation rate pattern. The material accumulation rate is the rate of which material such as manure is delivered to the predefined path at a certain time. The value of this accumulation rate typically varies during the day. By establishing the amount of accumulated material, the material accumulation rate pattern can be determined, and thereby also when the amount of accumulated material reaches a certain limit. Based on this information, the cleaning schedule can be adjusted.

According to some embodiments, the material accumulation rate pattern is based on an estimated amount of material accumulated during individual cleaning sessions. Thus, each cleaning session provides an individual material accumulation rate. Based on this individual material accumulation rate, the amount of material during each cleaning session can be determined.

According to some embodiments, the adjusting comprises predicting one or more points in time when an accumulated material value of the accumulated material pattern will reach an accumulation target and setting timing of a cleaning session to the predicted one or more points in time. Thus, the adjusted cleaning schedule comprises new timings of the cleaning sessions in the cleaning schedule.

According to some embodiments, the accumulation target is determined based on at least one of: cleanliness of the predefined path, an amount of energy required for cleaning the predefined path, an animal disturbance factor, wear of the scraper arrangement and/or the livestock area. Thus, the level of cleanliness may be determined based on a plurality of factors.

According to some embodiments, the method comprises obtaining user input indicative of a desired cleanliness level and adjusting the accumulation target based on the obtained cleanliness level. Thus, a user may adjust the cleanliness level.

According to some embodiments, the method comprises predicting, based on the monitored load quantity, a future material accumulation rate along the predefined path, and adjusting the cleaning schedule, based on the predicted future material accumulation rate along the predefined path. Thus, a predicted material accumulation rate may be determined, that can be used in adjusting the cleaning schedule.

According to some embodiments, the monitored load quantity comprises an estimated offset load and a variable load representing the amount of moved material, wherein the method comprises monitoring the load quantity during one or more calibration sessions when the scraper arrangement is cleaning the predefined path while the predefined path is determined to be clean, and estimating the offset load based on the monitored load quantity during the one or more calibration sessions. Thus, disturbing relatively constant parameters such as weight, wear etc. may be removed from the estimations.

According to some embodiments, the cleaning schedule defines timings for operating the scraper arrangement during one day. Thus, the cleaning schedule may comprise explicit starting times for the cleaning sessions.

According to some embodiments, the load quantity is monitored (i.e. sensed or measured) in the scraper driving mechanism, and comprises at least one of; power consumption, energy consumption or current consumption of a motor operating the scraper arrangement, mechanical load or tension in the driving mechanism, and pressure of a hydraulic arrangement operating the scraper arrangement. In other words, the monitored load quantity may be an intrinsic quantity of the driving mechanism. It represents the force needed to move the scraper arrangement along the predefined path. Thus the load quantity monitored in the scraper driving mechanism may be used as an indication of the amount of material which is moved by the scraper arrangement. It may be monitored by a load sensor connected to the driving mechanism and arranged to determine the load on the driving mechanism. By monitoring the intrinsic load quantity of the driving mechanism of the scraper arrangement, which represents the force needed to move the scraper arrangement along the predefined path, the material accumulated along the predefined path may be assessed. Thus, the load quantity may be used as a unit measuring dirtiness, or cleanliness, of the predefined path.

According to a second aspect, the disclosure relates to a computer program product comprising instructions which, when the program is executed by a computer, cause the computer to carry out the method according to the first aspect.

According to a third aspect, the disclosure relates to a computer-readable data carrier having stored thereon the computer program product of the second aspect.

According to a fourth aspect, the disclosure relates to a control arrangement for adjusting a cleaning schedule of cleaning sessions of a scraper arrangement arranged for removing manure in a livestock area. One cleaning session comprises one cleaning along a predefined path in the livestock area. The control arrangement is configured to monitor, while performing cleaning sessions in accordance with the cleaning schedule, a load quantity representing an amount of material moved by the scraper arrangement; and adjust the cleaning schedule, based on a variation in the monitored load quantity among the monitored cleaning sessions.

According to some embodiments, the control arrangement is configured to perform the method according to the first aspect.

According to a fifth embodiment, the disclosure relates to a scraper arrangement comprising a scraper arranged to remove material along a predefined path, a load sensor arranged to monitor a load quantity, and the control arrangement according to the fourth aspect.

DETAILED DESCRIPTION

In the following disclosure, solutions for adjusting a cleaning schedule for cleaning sessions of a scraper arrangement arranged for removing manure in a livestock area will be explained. The scraper arrangement typically comprises a scraper that is operated along a predefined path, such as an alley, in a livestock area in order to remove manure. The scraper is being movable by a scraper driving mechanism of the scraper arrangement. The scraper driving mechanism comprises, for example, a drive unit and mechanism such as a cable, wire or chain. The scraper may be movable relative the drive unit. Thus, the drive unit may then remain at one permanent location while the scraper is being operated and moved along a path.

Production of manure and the delivery of the same in the alley varies over the day. For example, during and after feeding of animals in the livestock area, the animals will produce more manure than the hours before feeding. The number of animals in the livestock area may also vary from time to time, and hence also the amount of manure delivered in the alley. Conventionally, the manure scraper has been run with a same cleaning session frequency over the entire day without taking into account the actual amount of manure in the alley.

The disclosed solution relies on the insight that the amount of manure varies during the day, and that the load on the scraper arrangement is dependent on the amount of material in the alley. If the amount of material is large, the scraper arrangement will typically use more power to be able to move the material, than if the amount of material in the alley is small. The load of the scraper may thus be used as a unit measuring dirtiness or cleanliness of the alley. Data showing the load during different times of a time period, e.g. a day, may be used to find out how the amount of material varies throughout the time period and thereby optimize the cleaning cycle of the scraper arrangement. Typically, the cleaning cycle is optimized by reducing variations in the amount of removed material during the day. The material in the alley may here include for example manure and bedding kicked out in the alley by the animals. However, the material may also include for example feeding leftover and other kinds of material that should also be removed. As the animals have the same routines, that is feeding times etc., the delivery rate pattern during different days normally does not change much if same conditions apply, and data from previous time periods may be used to optimize the cleaning schedule to make it better and more robust.

In the following, general embodiments of a scraper arrangement will be described. Thereafter the proposed method for adjusting a cleaning schedule for cleaning sessions of a scraper arrangement arranged for removing manure in a livestock area will be explained, and also some more examples of scraper arrangements.

Figure 1:
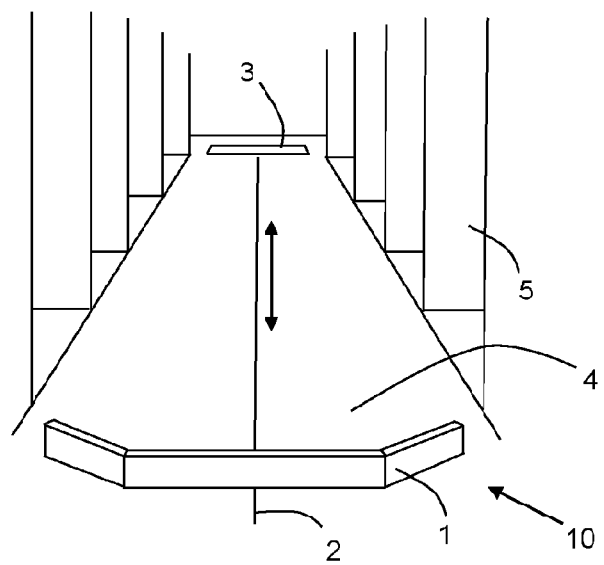
FIG. 1 illustrates a scraper in an alley in a livestock area according to some embodiments.

FIG. 1 illustrates a schematic view of a barn alley 4 according to one example embodiment. A scraper arrangement 10 comprises a scraper 1 and a scraper driving mechanism 2. The scraper driving mechanism 2 comprises a drive unit 7 in the form of a motor (FIG. 3), and a mechanism 22 to move the scraper 1 by the drive unit 7, such as a cable, wire or chain (FIG. 3, see also reference 12, FIGS. 9-11). The scraper 1 is arranged to operate in the alley 4. The scraper 1 is arranged to be pulled forward (and backwards, when appropriate) by the scraper driving mechanism 2. Thus, the scraper 1 is being movable by the scraper driving mechanism 2, relative to the drive unit 7. Thus, there is no drive unit 7 arranged, that follows with the movement of the scraper 1. The arrow in FIG. 1 illustrates the possible movement directions of the scraper 1 during operation. The scraper 1 may be arranged with a folding function, such that the scraper 1 is fully expanded when being operated forwards towards a location 3 where the manure for example can be drained to a sewer. When the scraper 1 is operated backwards, the folding function makes the scraper 1 at least partly fold towards its center. The scraper 1 can thereby be more easily operated backwards as it will have a smaller shape. The scraper 1 may have blades arranged in a V-shape. Alternatively, the blades may be straight, thus arranged perpendicular to the direction of movement when moving forward. Along the sides of the alley 4, there are stalls 5 where animals can stay, tied or untied.

Figure 2:
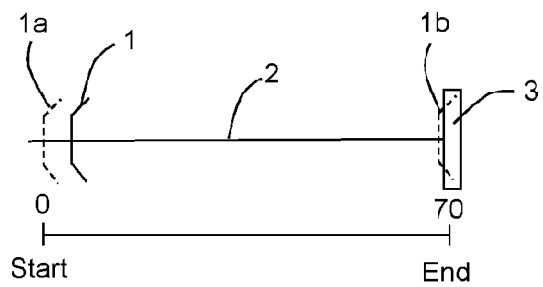
FIG. 2 illustrates a predefined path of the scraper from a top view according to some embodiments.

FIG. 2 illustrates a schematic view of a scraper 1 and a scraper driving mechanism 2 according to another example embodiment. The exemplifying distance of operation of the scraper 1 is here 70 meters, with a start position 1a at 0 (zero) meters and an end position 1b at 70 meters. However, as understood, this distance may vary. The start position is typically a rest position for the scraper 1, thus where it is located when not being operated. The end position is typically at a border of a location 3 where the manure is deposited. According to some embodiments, this distance defines a length of the cleaning path, thus the alley. The illustrated path is only an example, and the manure may be deposited at other locations along the path, e.g. at a middle position of the path.

Figure 3:
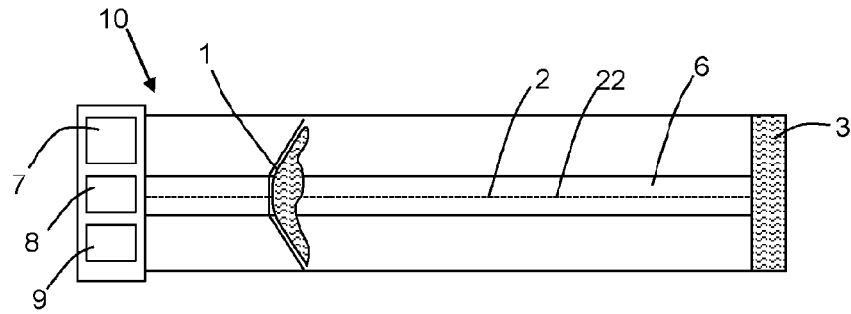
FIG. 3 illustrates a scraper arrangement with a scraper in operation along a predefined path according to some embodiments.

FIG. 3 illustrates a schematic view of a scraper arrangement 10 according to some embodiments. The scraper arrangement 10 comprises the scraper 1 and the scraper driving mechanism 2. The scraper driving mechanism 2 comprises a drive unit 7 and a mechanism 22, for example a cable drive mechanism, a hydraulic drive mechanism or a chain drive mechanism, which may include a cable, wire or chain. In the cable drive mechanism, a drive unit 7 comprising a motor operates a thick cable, for example a steel cable, that pulls the scraper 1. In the hydraulic drive mechanism, a motor of a drive unit 7 is connected to a hydraulic cylinder and a drawback moves back and forth, thereby moving the scraper 1 in steps. In the chain drive mechanism, a motor of a drive unit 7 operates a chain that pulls the scraper 1.

Figure 4:
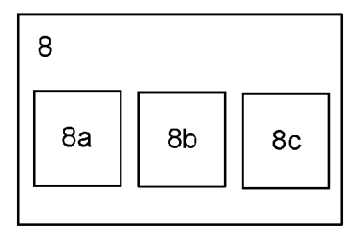
FIG. 4 illustrates a control arrangement according to some embodiments.

The scraper arrangement 10 also comprises a control arrangement 8, of which an example is illustrated in FIG. 4. The control arrangement 8 comprises a processor 8a and a memory 8b. The processor 8a may comprise one or more processing units, such as one or more Central Processing Units (CPUs). The memory 8b may comprise one or more memory units. The control arrangement 8 is configured to control the drive unit 7 in order to operate the scraper 1. The control arrangement 8 also comprises a communication interface 8c. The communication interface 8c is configured for communication of signals and/or data to and from the control arrangement 8, for example signals and/or data to the scraper driving mechanism 2 and signals and/or data from a load sensor 9 that will be explained in the following. The communication interface 8c may also comprise a user interface (not shown). The user interface may be a remote user interface. The user interface may comprise an input device such as a touch screen, keyboard or microphone. The control arrangement 8 may also partly be remote, e.g. in "a cloud", Data may then be communicated via the communication interface to the cloud, or directly from sensors to the cloud. The data may then be processed in the cloud (cloud computing), and control data or signal sent back to the scraper arrangement 10. Thus, the scraper arrangement 10 may be controlled via a programmable logic controller (PLC), an edge computer, the cloud, a Personal Computer (PC), a smart device, etc.

The scraper arrangement 10 further comprises a load sensor 9. The load sensor 9 is arranged to indirectly or directly monitor a load quantity of the scraper driving mechanism. The load quantity comprises at least one of; power consumption, energy consumption or current consumption of a motor operating the scraper arrangement 10, mechanical load or tension in the driving mechanism, and pressure of a hydraulic or pneumatic arrangement operating the scraper arrangement 10. Thus, the load sensor 9 is for example a power sensor that is configured to sense the power (kW) consumed by the motor of the drive unit 7. The power sensor comprises for example a thermistor, a thermocouple or a diode detector. The load sensor 9 is alternatively an energy meter, that accumulates the power over time to calculate the total energy (kWh) consumed by the motor. The load sensor 9 is still alternatively a current sensor that measures the current consumed by the motor. An example of such sensor is a Hall sensor. The load sensor 9 may alternatively include a voltage sensor that measures the voltage over the motor. Alternatively the load sensor 9 is a sensor detecting a mechanical tension or load in a part of the driving mechanism, such as a sensor measuring tension in a cable or wire of the drive mechanism. The load sensor 9 is still alternatively a hydraulic or pneumatic pressure sensor, that is configured to measure the pressure in a hydraulic or pneumatic arrangement operating the scraper arrangement 10. Such a load sensor 9 is for example a transducer, that is generating an electrical signal in proportion to the pressure it measures. The control arrangement 8 is for example configured to receive monitored load quantities from the load sensor via the communication interface 8c.

One cleaning session comprises one cleaning along a predefined path in the livestock area. The predefined path is for example along one alley. A cleaning session thus comprises operating the scraper 1 along the predefined path from a starting position to an end position of the predefined path. The cleaning session may also include to pull the scraper 1 backwards from the end position to the start position. Alternatively, the backward operation is not considered a part of the cleaning session. In any way, the scraper 1 is not considered to clean the predefined path when being pulled backwards. A cleaning schedule typically comprises a plurality of cleaning sessions.

A cleaning schedule is performed during a predetermined time period. The time period is for example one day (24 hours). The time period is alternatively only a part of a day, thus 12 hours. The time period may instead be smaller part of a day, for example a time period of 3-6 hours after feeding. The time period should encompass a repeatable pattern of animals in the livestock area. For example, one day may comprise morning feeding/eating, lunch feeding/eating and evening feeding/eating. This pattern is repeated every day.

The predefined path may be a path along an alley 4 with a location 3 for manure at one end of the path. Alternatively, there may be several locations 3 along the predefined path, where manure is collected and removed from the scraper 1. Thus, at a location 3, the material collected and moved by the scraper 1 is removed from the scraper 1. From the locations 3, the material is typically drained to a sewer. Alternatively, the material moved by the scraper 1 is continually drained via a slatted floor along the predefined path.

The predefined path has a start position and an end position, see for example FIG. 2. The predefined path may be straight or may comprise bends or curves. A wide or long alley may be provided with two or more scrapers 1, each cleaning a part of the alley. The scrapers 1 may then be arranged consecutively along an alley or in parallel for the same segment of the alley. In such cases, the scrapers 1 may be driven by the same scraper driving mechanism 2, however the scraper driving mechanism 2 may then include for example a longer chain, a motor with more power etc. Thus, the scraper arrangement 10 will then comprises the two or more scrapers, and the predefined path will encompass the individual predefined paths of the two or more scrapers 1.

There may be other kinds of material than manure along the predefined path, for example bedding kicked out from the stalls 5. Thus, the scraper arrangement 10 is arranged for removing manure, but when being operated it typically moves and removes material including manure along the predefined path. The scraper 1 moves material along the predefined path and removes it by pushing the material to a location where it for example falls down into a manure pit.

The control arrangement 8 may store a computer program comprising instructions which, when the program is executed by the processor 8a, cause a scraper arrangement to carry out a method for adjusting a cleaning schedule for cleaning sessions of the scraper arrangement. The scraper arrangement is for example any of the scraper arrangements 10 as described herein. As previously described, the scraper arrangement 10 is arranged for removing manure in a livestock area.

Figure 5:
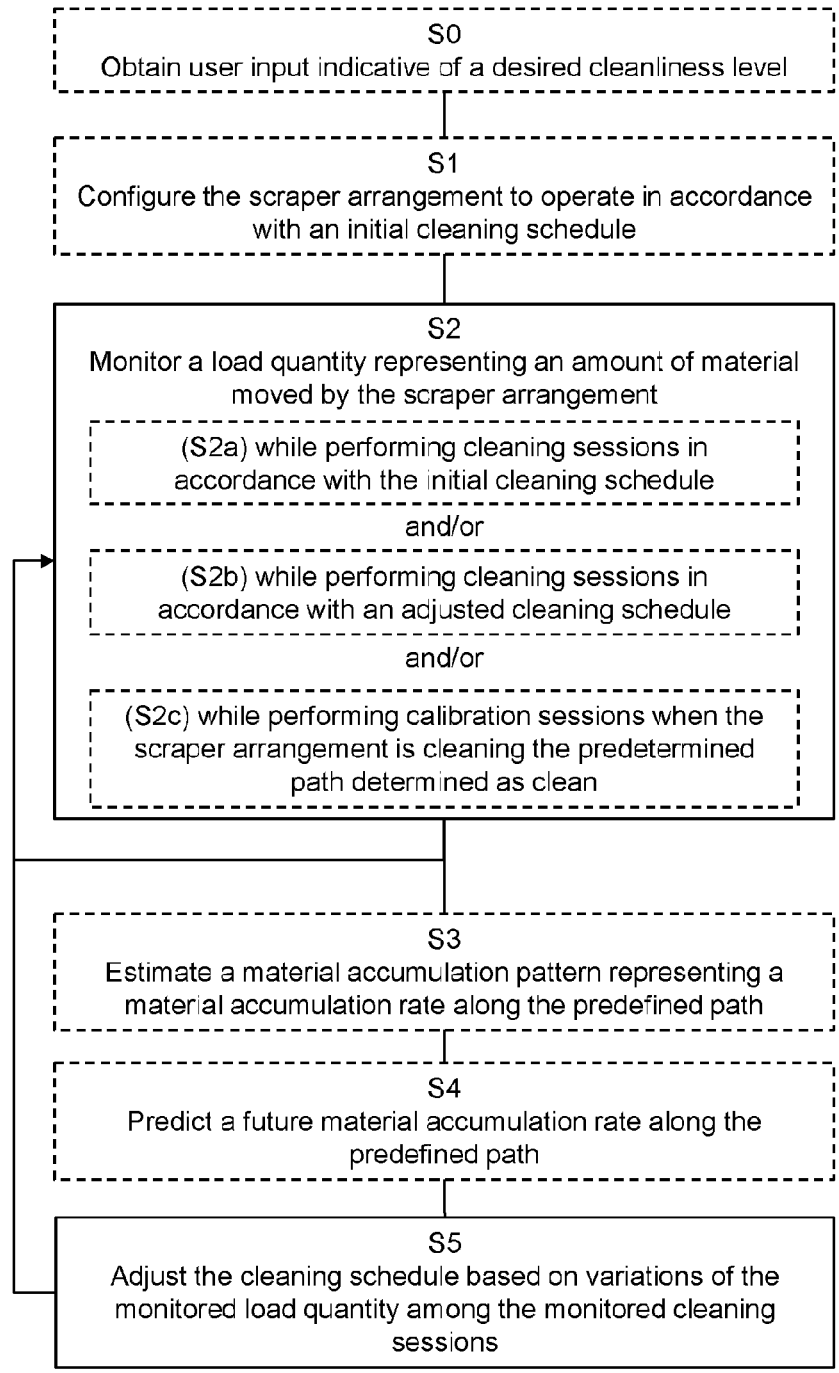
FIG. 5 illustrates a flow chart of a method for adjusting a cleaning schedule for cleaning sessions of a scraper arrangement according to some embodiments.

In the following the method will be explained with reference to the flow chart in FIG. 5. Initially, the method may include to obtain S0 user input indicative of a desired cleanliness level and adjusting an accumulation target based on the obtained cleanliness level. The accumulation target will be explained more in the following. The user may make an input to the control arrangement 10 via the communication interface 8c. A suggested cleanliness level may be communicated, e.g. displayed, to the user via the user interface. The suggested cleanliness level is for example a balanced cleanliness level, balanced between cost for cleaning and increased cleanliness. The user may then choose the balanced cleanliness level, or decide to decrease or increase the cleanliness level, within limits. The cleanliness level decides the number of cleaning sessions per cleaning schedule. A high number of cleaning sessions per cleaning schedule means increased cleanliness, compared to a lower number of cleaning sessions per cleaning schedule. The cleanliness level may decide the maximum allowed load to the scraper arrangement 10, thus a predetermined load threshold that will be described in the following. The predetermined load threshold may thus be set by the user via a choice of cleanliness level. The predetermined load threshold corresponds to the maximum allowed total amount of material in the predefined path before it is removed. A low predetermined load threshold means a greater number of cleaning sessions per cleaning schedule and thus an increased cleanliness, than a higher predetermined load threshold allowing more material to be accumulated in the predefined path before it is removed. User input may be one or more touches on a touch screen, one or more keyboard inputs or a voice command, to decide the cleanliness level. The user may thus choose between different levels of cleanliness.

The method may also comprise configuring S1 the scraper arrangement 10 to operate in accordance with an initial cleaning schedule. The configuring S1 may be pre-set from by the manufacturer or performed manually by the user. Thus, the configuring may include obtaining an initial cleaning schedule, e.g. from a memory 8b. The configuring S1 for example includes to set the number of cleaning sessions in the cleaning schedule, and the time period between successive cleaning sessions. The initial cleaning schedule comprises timing for a plurality of cleaning sessions. The initial cleaning schedule may have a fixed same time in-between the cleaning sessions, thus, a fixed time between every two successive cleaning sessions. The configuring may also include to set the number of times the initial cleaning schedule should be performed. The initial cleaning schedule may be a good guess of the cleaning schedule for the predefined path.

The method is intended to adjust the cleaning schedule, such that the predefined path is cleaned in accordance with the selected cleanliness level, or otherwise sufficiently cleaned. Sufficiently cleaned here means to have a balance between cleanliness and costs for cleaning the predefined path. In order to be able to adjust the cleaning schedule, data indicating the amount of material in the predefined path is needed. As described, the load on the scraper arrangement 10 is dependent on the amount of material in the predefined path. The load may thus be used as a unit measuring dirtiness or cleanliness of the alley. Thus, by monitoring the load while the cleaning sessions are performed, data indicating the amount of material in the predefined path is obtained. Initially, the initial cleaning schedules may be performed. The method then comprises monitoring S2a a load quantity representing an amount of material moved by the scraper arrangement 10 while performing cleaning sessions in accordance with the initial cleaning schedule. The initial cleaning session gives training data, thus load quantities, for adjusting the cleaning schedule. The method may comprise performing the initial cleaning schedule a plurality of times with a fixed time in-between each cleaning session. The initial cleaning schedule may be started at the same time each time period, e.g. day. Hence, training data from performing the initial cleaning schedules a plurality of times may be obtained. The number of cleaning sessions is typically a good guess to achieve sufficient cleaning of the predefined path and may be a number used in the current used cleaning schedule in the barn. As understood, the number is highly dependent upon the size of the barn and the number of animals in the barn. Based on these load quantity data from the initial cleaning sessions, the method comprises adjusting S5 the cleaning schedule, based on a variation in the monitored load quantity among the monitored cleaning sessions from the initial cleaning schedule(s). Thus, after steps S0-S1, the method may start by operating the scraper arrangement 10 according to the initial cleaning schedule, and thereafter adjust the cleaning schedule for the next time period, e.g. the next day, as will be explained in the following. The next time period the cleaning schedule shall be performed, e.g. the next day, the method comprises operating the scraper arrangement 10 according to the adjusted cleaning schedule while monitoring the load quantity. Thus, after the initial cleaning schedule(s) have been performed and an adjusted cleaning schedule estimated, the monitoring S2 comprises monitoring S2b the load quantity while performing cleaning sessions in accordance with the adjusted cleaning schedule. When data has been collected from also the cleaning sessions of the adjusted cleaning schedule, the method comprises adjusting S5 the cleaning schedule, based on a variation in the monitored load quantity among the monitored cleaning sessions. These monitored cleaning sessions comprises cleaning sessions performed in accordance with the adjusted cleaning schedule but may also comprise cleaning sessions from previous performed cleaning schedule(s). In some embodiments, for each new adjusted cleaning schedule that is executed and monitored, and from which data is used, the data from the oldest performed cleaning schedule is discarded. Thus, in the beginning, the initial cleaning schedules will have an impact on the adjusting, but after a while they will be outdated.

The load quantity may be any one of the load quantities as described herein. The monitoring comprises sensing the load quantity using a load sensor. The monitoring may also comprise saving the value of the sensed load quantity in a memory, for example the memory 8b in the control arrangement 8 or in remote storage, referred to as a "cloud". The load on the scraper arrangement 10 is thus being measured. The load may thereafter be correlated with the position of the scraper 1. As the speed of the scraper 1 is predetermined and known, the position of the scraper 1 may typically be calculated using the speed and the time elapsed since the scraper 1 started moving from the start position. If the predefined path is along an alley where there is only one location 3 to leave material at the end of the predefined path, it is sufficient that the load quantity is measured at the end of the predetermine path, when the amount of material in the scraper 1 is the most and just before the material leaves the scraper 1. The monitored load quantities may be saved in a data base, together with the time and/or estimated position.

Accordingly, a new adjusted cleaning schedule may be determined after each performed cleaning schedule, and/or after one or more initially performed cleaning schedules. The future scheduling of the scraper 1 thus is adapted based on the measured load. This adjusted cleaning schedule is the cleaning schedule that the scraper arrangement 10 should use when cleaning the predefined path the next time. The variation is for example a variance. Variance is a feature informing how cleaning sessions are different from each other during the day. A low value of variance means, that the predefined path is cleaned when actually needed. Thereby the overall cleanness during the day will be improved. In other words, the adjusting S5 comprises adjusting the cleaning schedule, such that the variation in the monitored load quantity among the individual cleaning sessions is reduced. The method may for example include identifying one or more time periods when the monitored load quantity is high (thus above a first predetermined load quantity value), and clean more often during these time periods, than during time periods when the monitored load quantity is low (thus below a predetermined second load quantity value, where the second load quantity value is lower than the first load quantity value). In other words, in some embodiments, the adjusting S5 comprises adjusting the cleaning schedule, such that during one time period, cleaning is performed more frequently during a first time interval corresponding to a first average load, than during a second time interval corresponding to a second average load. The first average load is greater than the second average load. Thus, more cleaning will then be performed during time periods with a high average load, compared to time periods with a lower average load, compared to the high average load. The time periods are included in the same cleaning schedule. Accordingly, the variation among the load monitored load quantities can be reduced. The method may also include to determine the amount of accumulated material, based on the monitored load quantities, for each individual cleaning session and adjusting the cleaning schedule such that variation between the amount of accumulated material of individual cleaning sessions is reduced. The variation in the monitored load quantity among the individual cleaning sessions is thus mitigated. In some embodiments, the adjusting S5 comprises adjusting the cleaning schedule, such that the monitored load quantity stays below or at a predetermined load threshold during all the cleaning sessions. For example, if the monitored load quantity is above the predetermined load threshold, the predefined path should be cleaned more often.

The variation may represent a variation among load quantities monitored during different cleaning sessions within one time period. For example, the time period is one day e.g. 24 hours. The time period comprises a plurality of cleaning sessions. During each cleaning session, at least one measured value of the load quantity is obtained, typically representing the highest or average load on the scraper arrangement 10 during the cleaning session. The variation between these values may be reduced. The variation may alternatively or also represent a variation among load quantities monitored during different cleaning sessions during different time periods. For example, the time periods may be a plurality of previous days. By using the herein described methods, the variation between the values of the load quantity obtained during the different cleaning sessions during the different days may be reduced. The variation may then represent average variation for the plurality of previous time periods, e.g. days.

Some elements contributing to the overall load of the scraper arrangement 10 and are independent from cow behavior and constant (or very slowly changing). These are: length of predefined path (alley length), type of scraper arrangement 10, floor type and surface quality, and condition of scraper arrangement 10. These elements may be introduced in the calculation as an offset load value.

Thus, the monitored load quantity may comprise an estimated offset load and a variable load representing the amount of moved material. In order to determine the offset load, in some embodiments, the method comprises monitoring S2c the load quantity during one or more calibration sessions when the scraper arrangement 10 is cleaning the predefined path while the predefined path is determined to be clean. Thus, during a calibration session, the scraper 1 is operated along the predefined path while the scraper 1 is substantially free from material. Thus, the total amount of material should be below a predetermined limit. For example, the calibration session may be performed just after another performed cleaning session, or during night, when manure delivery is low. A user may also visually establish that the predefined path is clean, and manually initiate a calibration session by making an input to the control arrangement. The monitored load quantity during the calibration session will indicate the offset load of the scraper arrangement 10. The method thereafter comprises estimating the offset load based on the monitored load quantity during the one or more calibration sessions. The offset load is typically the average load of the scraper arrangement 10 during the calibration session(s), or an individual measurement, as the load should be essentially the same during a calibration session. Thus, the offset load may be estimated and accounted for (e.g. removed) in the adjusting S5. The offset load typically does not variate that much. However, the one or more calibration sessions may be performed at certain intervals, for example every day, every week or every month.

Figure 6:
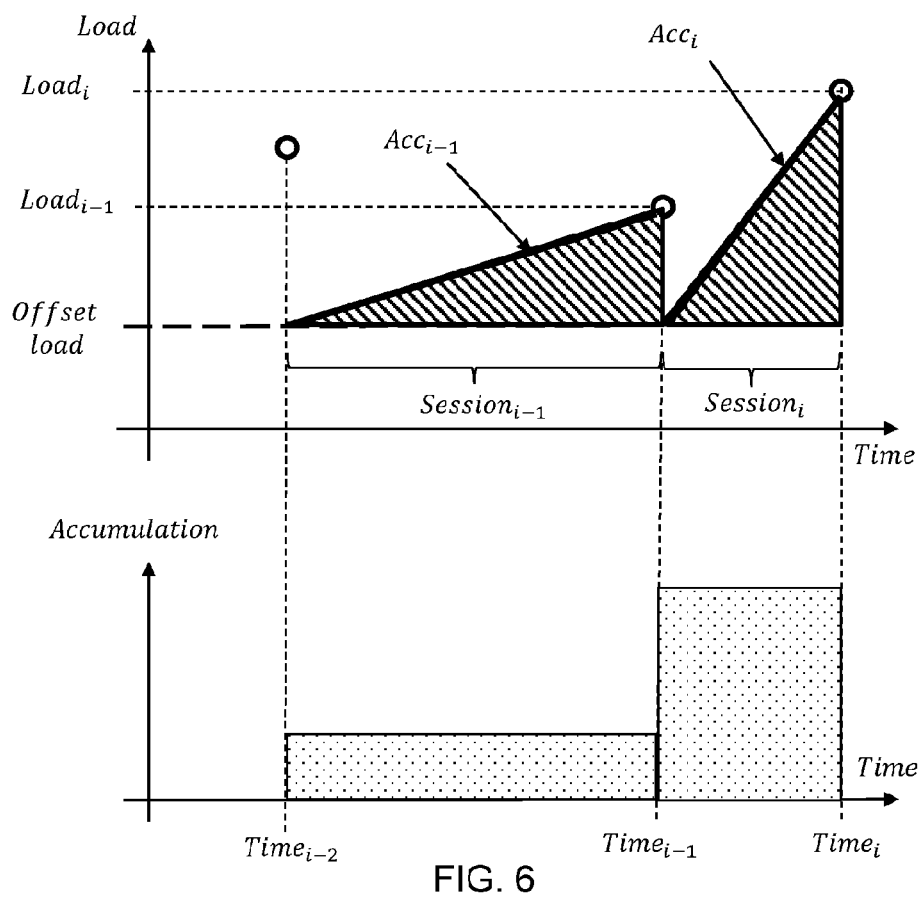
FIG. 6 illustrates how an accumulation parameter rate is calculated according to some embodiments.

In the following examples how variation among the individual cleaning sessions may be reduced, will be explained. FIG. 6 illustrates in the uppermost diagram, the monitored one or more load quantities for two performed cleaning sessions, Session$_i$ and Session$_{i-1}$. Session$_i$ started sometime between Time$_{i-1}$ and Time$_i$, and ended at Time$_i$. Session$_{i-1}$ started sometime between Time$_{i-2}$ and Time$_{i-1}$, and ended at Time$_{i-1}$. For each cleaning session, the monitored load quantity starts from the offset load (as the scraper is empty when the cleaning session starts), and ends at the load quantity obtained at Time$_i$, typically the highest obtained load quantity. As described, the highest obtained load quantity is typically the load quantity measured just before the material accumulated in the scraper 1 during the cleaning session leaves the scraper 1, thus, it should represent the highest load during the cleaning session. In some embodiments, it is sufficient that this highest load is measured. The highest load may be determined by monitoring the load quantity during the cleaning session and determine the greatest load quantity from the monitored load quantity during the session. Alternatively, the load quantity is measured just before the material accumulated in the scraper 1 during the cleaning session leaves the scraper 1.

The greatest load quantity from Session$_i$ may then be Load$_i$, and the greatest load quantity from Session$_{i-1}$ may be Load$_{i-1}$. Alternatively, the load on the scraper 1 Load$_x$ is determined as an average load during a passage of the cleaning path, e.g. the last 5% stretch of the cleaning path, for example an average of the monitored load quantity during the last 1-2 meters of the cleaning path. Alternatively, the load on the scraper 1 Load$_x$ is determined as the average load during the full cleaning session is used. Thus, an average load on the scraper 1 is determined form the monitored load quantities. This might be beneficial in case the scraper 1 is exposed to uneven friction, that might cause high momentary loads on the scraper 1. Still alternatively, the load on the scraper may be determined by integrating the load quantity over the time period (thus calculating the average value of the load quantity, representing the general load of the scraper 1). As understood, an average may be determined by calculating the mean average, determining the median or mode (determine the most frequent occurring value). For each cleaning session, a material accumulation rate Acc may be calculated, based on the amount of material removed by the scraper. The highest or alternatively the average load during the cleaning session, or part of the cleaning session, indicates the amount of material delivered since the previous cleaning session ended. By dividing this load with the time since the previous cleaning session ended, an average accumulation rate during the time period may be obtained. Thus, this rate describes how much material/hour that has been delivered, in average, during the time period from when the previous Session$_{i-1}$ ended, to the end of the current Session$_i$ performed subsequently after the previous Session$_{i-1}$. This average material accumulation rate Acc may be determined as:

$$Acc_i = \frac{Load_i - \text{offset load value}}{Time_i - Time_{i-1}} \quad (1)$$

where Load$_i$ is the highest or average load during Session$_i$ (or part of Session$_i$), offset load value is the latest determined offset load, Time$_i$ is the time when the Session$_i$ ended, and Time$_{i-1}$ is the time when the previous Session$_{i-1}$ ended. The average material accumulation rate Acc is thus calculated basing on the load in each session and the session-to-session time. The unit of the average material accumulation rate Acc is for example Watt/hour. The value of the average material accumulation rate Acc typically varies during the day. It may also vary for the same time period at different days.

The calculated average material accumulation rate Acc for each individual cleaning session is illustrated in the lowermost diagram of FIG. 6. A material accumulation rate pattern Acc(t) for a time period of a cleaning schedule may be established using the calculated material accumulation rates Acc for all cleaning sessions during the cleaning schedule. In other words, the material accumulation rate pattern is based on an estimated material accumulation rate during individual cleaning sessions. The material accumulation rate pattern Acc(t) is simply the different calculated material accumulation rates Acc during a time period arranged in time in a diagram. Thus, if the cleaning schedule comprises the two cleaning sessions illustrated in FIG. 6, the lowermost diagram would illustrate the material accumulation rate pattern for this cleaning schedule. The material accumulation rate pattern Acc(t) thus illustrates how the material accumulation rate changes with time during the time period of the cleaning schedule. Acc(t) is also a function that illustrates how quick the amount of manure along the predefined path is increasing. Thus, in some embodiments, method comprises estimating S3, based on the monitored load quantity, a material accumulation rate pattern representing a material accumulation rate along the predefined path. The adjusting S5 the cleaning schedule is then based on the estimated material accumulation rate pattern.

Figure 7:
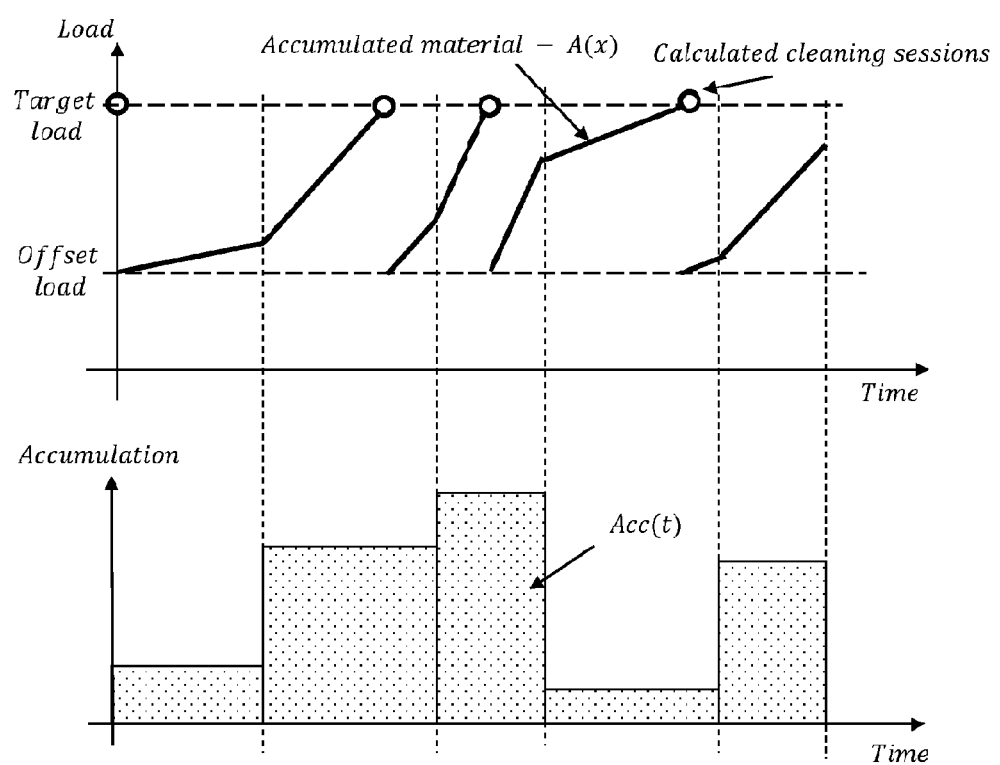
FIG. 7 illustrates an accumulated load pattern based on several previous time periods, and calculated timing for cleaning sessions based on the accumulated load pattern, according to some embodiments.

Experiments have shown, that the material accumulation rate Acc changes day by day. Nevertheless, each day show similar trends that are specific for a particular alley. By using data, thus the material accumulation rate Acc or rate pattern Acc(t) from one or more of the previous time periods, e.g. a few days, a predicted future material accumulation rate pattern Acc(t) for the next cleaning session, e.g. for the next day, may be established. In other words, the material accumulation rate pattern is based on estimated material accumulation rates during individual time periods with cleaning sessions. A machine learning algorithm may be used to predict the pattern. Such algorithm is for example regular averaging, Simple Moving Average, Naïve, or Exponential Smoothing or average or weighted average from the last days (e.g. 4 days). Thus, in some embodiments, the method comprises using a predicting algorithm to establish a material accumulation rate pattern for the next cleaning session, e.g. for the next day. An example of such established material accumulation rate pattern Acc(t) is illustrated in the lowermost diagram of FIG. 7.

Based on the function Acc(t), thus the established material accumulation rate pattern Acc(t), the total amount A(x) of material accumulated in the scraper 1 at a certain moment in time x can be calculated. By integrating the function Acc(t) over a certain time period, the total amount of material accumulated in the scraper 1 during that certain time period can be established. Hence, the accumulated material A(x) may be calculated using the predicted material accumulation rate pattern along the predefined path over time, thus future material accumulation rates along the predefined path over time. Thus, using the different predicted material accumulation rates in the predicted material accumulation rate pattern along the predefined path, the amount of accumulated material A(x) can be calculated continuously along the predefined path. The accumulated material A(x) is illustrated in the uppermost diagram in FIG. 7. The slope of the accumulated material A(x) is thus directly dependent on the value of the function Acc(t). Actually, the slope of the accumulated material A(x) at a certain time t represents the value of the predicted material accumulation rate pattern Acc(t) at the same time t. Thus, in some embodiments, the method comprises predicting S4, based on the monitored load quantity, a future material accumulation rate along the predefined path, where the future material accumulation rate is the slope of the accumulated material A(x). The cleaning schedule may then be adjusted S5, based on the predicted future material accumulation rate along the predefined path. When the accumulated material A(x) reaches an accumulation target, a time point for a start of a cleaning session is determined. Thereafter the total amount of accumulated manure A starts over again from the offset load, as the scraper is empty. Thus, in some embodiments, timings for starting a cleaning session is determined as each point in time when the total amount of accumulated manure A reaches the accumulation target. In other words, the adjusting S5 comprises predicting one or more points in time when an accumulated material value of the accumulated material pattern will reach an accumulation target. The adjusting S5 also comprises setting timing of a cleaning session to the predicted one or more points in time. Thus, a new adjusted cleaning schedule for the next time period, e.g. next day, can be established. The new adjusted cleaning schedule comprises the predicted time points when the cleaning sessions shall be started. For example, the cleaning schedule defines timings for operating the scraper arrangement 10 during one day. In some embodiments, the accumulated material A may be referred to as the accumulated manure.

In the adjusted new cleaning schedule, it is predicted that the load on the scraper arrangement 10 shall never go beyond the accumulation target. Thereby the variation in the load of the cleaning sessions will be reduced, and optimally removed. The predefined path will then be cleaned at timings when it is predicted that the amount of material in the predefined path will have reached the accumulation target. However, in reality, when the latest adjusted cleaning schedule is executed, the amount of material in each cleaning session may vary slightly again. These variations will then be taken into account when adjusting the cleaning schedule anew. By taking data from several previous time periods, e.g. days, with cleaning cycles, a better estimate of the next cleaning schedule can be made. For example may cleaning cycle data during one, two, three, four, five, six, seven, eight, nine or ten previous time periods may be taken into account.

The accumulation target may be determined from a desired cleanliness level set e.g. by a user. For example, the accumulation target is determined based on at least one of: cleanliness of the predefined path, an amount of energy required for cleaning the predefined path, an animal disturbance factor, wear of the scraper arrangement 10 and/or the livestock area. The cleanliness of the predefined path is for example a desired cleanliness of the predefined path. The greater the number of cleaning sessions, the greater the cleanliness. The amount of energy is for example the highest allowed amount of energy required for cleaning the path during a cleaning schedule. The greater the number of cleaning sessions, the higher amount of energy is needed. However, a greater number of cleaning sessions also reduce the amount of energy used during each cleaning session, as the amount of material to remove then is less. Thus, a balance between the number of cleaning sessions and the amount of energy used may be used to determine the accumulation target. The animal disturbance factor is for example a highest allowed animal disturbance, defined as a maximum number of allowed cleaning cycles during a time period. The greater the number of cleaning sessions, the more the animals may be disturbed. The wear of the scraper arrangement 10 may be a highest allowed wear of the scraper arrangement 10 and/or the livestock area, determined as a maximum number of allowed cleaning sessions during a time period. The greater the number of cleaning sessions, the more wear may be caused to the scraper arrangement 10 and/or livestock area. For example, friction between the scraper 1 and the floor of the predefined path may cause wear both to the scraper 1 and the floor. Any of these factors may put a lower and/or upper limit on the number of cleaning sessions that can be performed during a time period. In some embodiments, the accumulation target corresponds to the aforementioned predetermined load threshold.

Figure 8:
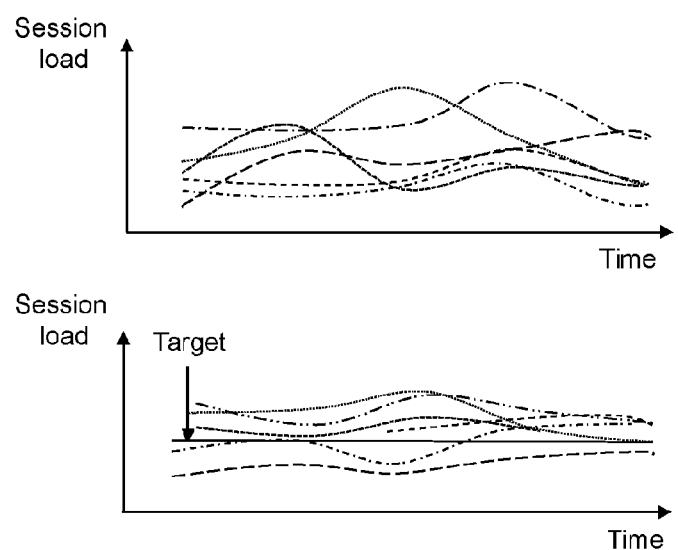
FIG. 8 illustrates variations in the load quantity with and without use of the method.

The result of the method is a "flattening" of the load on the scraper arrangement 10. FIG. 8 illustrates in an uppermost diagram approximated curves of the monitored load quantity obtained using cleaning schedules established without the herein described method, using conventional cleaning schedules. The lowermost diagram of FIG. 8 illustrates approximated curves of the monitored load quantity during cleaning sessions performed according to the herein described method. Both diagrams have the same time scale and the same session load scale. As can be seen, the variation among the individual load quantities for each cleaning session in the lowermost diagram is less than the variation among load quantities for each cleaning session in the uppermost diagram In one non-limiting illustrative example, a user wants to adjust the cleaning schedule for a scraper arrangement 10 in a barn. The user starts the procedure of adjusting the cleaning schedule by making an input to the control arrangement 8, for example choosing "Adjusting cleaning schedule" on a remote interface (not shown), for example a mobile phone or computer of the user.

The user desires a balanced cleanliness level. The user makes an input to the control arrangement 8 via the remote interface, requesting the desired cleanliness level. The control arrangement 8 thus obtains S0 user input indicative of the desired cleanliness level. The initial cleaning schedule comprised ten different individual cleaning sessions with the same fixed time interval between the different individual cleaning sessions. The initial cleaning schedule has a time period of one day. The initial cleaning schedule is here configured in advance to the control arrangement 8, and the procedure of adjusting the cleaning schedule is automatically started and performed by the control arrangement 8 after the user has made the cleanliness level input. The initial cleaning schedule is performed for a plurality days. In this example, the cleaning schedule is performed once each day for four days. It also starts at the same time each day. Thus, ten cleaning sessions are performed each day. The load quantity is monitored S2a during the cleaning sessions performed during the initial cleaning schedules. A load sensor 9 had previously been installed inside a motor controller (not shown) controlling the motor of the drive unit 7 on a power supply line (without interference with control signals). The motor controller is for example a variable-frequency drive (VFD) controller. This load sensor monitors the load on the motor, here the power supplied to the motor. The data is stored in the cloud. The control arrangement 8 is thus configured to communicate with a remote storage, here referred to as "the cloud". Each performed cleaning schedule gives rise to a material accumulation rate pattern for that day. A predicted material accumulation rate pattern is estimated S3 using data collected during the cleaning sessions during the past four days. The predicted material accumulation rate pattern using data from the past four days was in this example estimated using Simple Moving Average. The predicted material accumulation rate pattern for the past four days is then used to predict a future material accumulation rate along the predefined path. When the accumulated material according to the future material accumulation rate reaches an accumulation target, a time point for a cleaning session is established. It is then known that the accumulated material will be removed, and the accumulated amount starts from a base line again, e.g. an offset load level. After timing for cleaning sessions for the whole predicted material accumulation rate pattern have been determined, a new adjusted cleaning schedule S5 has been determined, that can be used for the next day.

The next day, the adjusted cleaning schedule is executed. The load quantity is then monitored S2b while performing the cleaning sessions in accordance with the adjusted schedule. Thereafter, the step S5 (and optionally step S3-S4) is repeated using the monitored data for the cleaning sessions performed during the four latest cleaning schedules. Thus, in this case, data from the three latest performed initial cleaning schedules plus data from the performed adjusted cleaning schedule are used. The next day, data from the two latest performed initial cleaning schedules plus data from the two latest performed adjusted cleaning schedule will be used, and so one. Thus, the most recent data will be used.

The cleaning schedule may thus be adjusted for variations in the monitored data each day. The method may be performed more or less automatically. In some embodiments, the desired cleanliness level may be predetermined. The method may then be performed totally automatically. The user does not have to create or adapt the cleaning schedule manually, as the method will make this automatically. The process may thus be improved regarding one or more of: power consumption, machine wear, maintenance and service time, animal welfare, safety.

The disclosure also related to a control arrangement 8 for adjusting a cleaning schedule of a cleaning session of a scraper arrangement. The scraper arrangement is for example the scraper arrangement as previously described. The control arrangement 8 is being configured to monitor, while performing cleaning sessions in accordance with the cleaning schedule, a load quantity representing an amount of material moved by the scraper arrangement 10. The control arrangement 8 use some of the described load sensors 9 for monitoring the load quantity. The control arrangement 8 is also configured to adjust the cleaning schedule, based on a variation in the monitored load quantity among the monitored cleaning sessions. The control arrangement 8 may be configured to perform the method according to any of the embodiments as described herein. The control arrangement 8 may include a memory, thus a computer-readable data carrier, that has stored thereon a computer program product that comprises instructions for executing the method according to any one of the embodiments as described herein.

Figure 9:
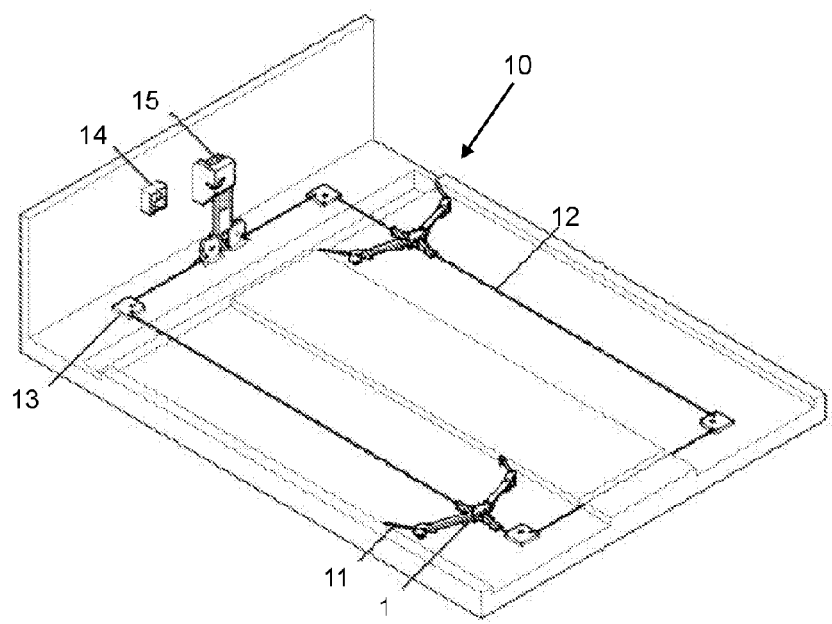
FIGS. 9-11 illustrate different embodiments of scraper arrangements.
Figure 10:
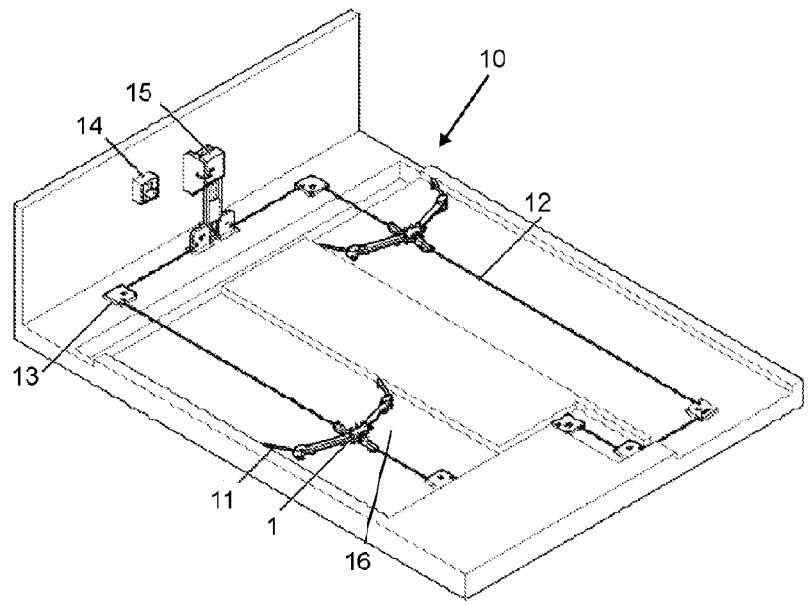
Figure 11:
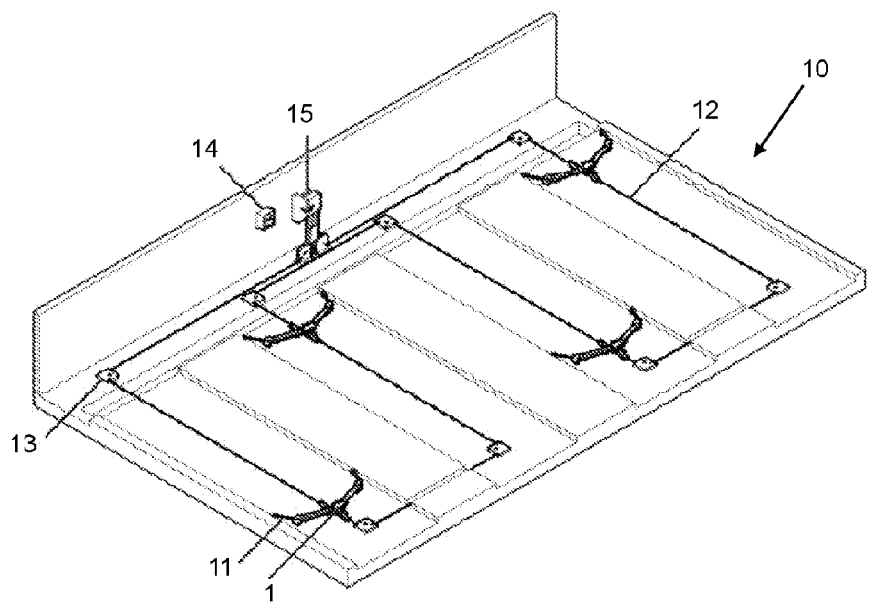

The disclosure also relates to a scraper arrangement 10 comprising a scraper 1 arranged to remove material along a predefined path. The scraper arrangement 10 comprises the load sensor 9 arranged to monitor a load quantity, and the control arrangement 8. The scraper arrangement 10 may be any of the scraper arrangements as described herein. For example, in FIGS. 8-10 a plurality of alternative scraper arrangements 10 are illustrated. The scraper arrangements 10 are all operated with chain drive. The scraper arrangements 10 are all operated on two or more alleys, in comparison with the previous examples shown in FIGS. 1-3, which were all operated on one alley. However, the principle is the same, and the method may thus be used also on a predefined path that comprises two or more alleys. In FIG. 9, the scraper arrangement 10 is arranged for cleaning two equal alleys of equal lengths. A drive unit 15 pulls through corner wheels 13 a continuous loop of chain 12 to scraper blades 11 of the scraper 1 that are attached to the chain 12. The drive unit 15 is controlled by a control arrangement comprising an electric control device 14. The scraper arrangement 10 may be assembled in a variety of configurations to suit different layouts. The scraper blades 11 may be changed to accommodate different conditions. In FIG. 10, the scraper arrangement 10 is arranged for cleaning alleys of different lengths. When the alleys are not equal in length, the scraper blade 11 that must travel a shorter distance may be attached to a special towing kit called a slider sled 16. The chain may be recessed in the floor, or may be on or above the floor. In FIG. 11, the scraper arrangement 10 is arranged for cleaning four alleys. Thus, the number of alleys may vary. There may however be restrictions, for example, the chain length should not exceed a maximum allowable chain length.

The present disclosure is not limited to the above-described preferred embodiments. Various alternatives, modifications and equivalents may be used. Therefore, the above embodiments should not be taken as limiting the scope of the disclosure, which is defined by the appending claims.

The invention claimed is:

1. A method for autonomously operating a scraper arrangement for adjusting a cleaning schedule for individual cleaning sessions of the scraper arrangement, wherein the scraper arrangement comprises a scraper and a load sensor and is arranged for removing manure in a livestock area; wherein one individual cleaning session comprises one cleaning along a predefined path in the livestock area; the method comprising:
   monitoring by the load sensor, while performing individual cleaning sessions in accordance with the cleaning schedule, a load quantity representing an amount of material moved by the scraper arrangement;
   adjusting the cleaning schedule automatically, based on a variation in the monitored load quantity among the monitored individual cleaning sessions, such that the variation in the monitored load quantity among the individual cleaning sessions is reduced,
   wherein the variation represents a variation among load quantities monitored during different individual cleaning sessions within one time period; and
   automatically operating the scraper arrangement according to the adjusted cleaning schedule.

2. The method according to claim 1, further comprising: obtaining an initial cleaning schedule,
   wherein the monitoring comprises monitoring the load quantity while performing individual cleaning sessions in accordance with the initial cleaning schedule.

3. The method according to claim 1, wherein the monitoring further comprises monitoring the load quantity while performing individual cleaning sessions in accordance with the adjusted cleaning schedule.

4. The method according to claim 1, wherein the adjusting comprises adjusting the cleaning schedule, such that the monitored load quantity stays below or at a predetermined load threshold during all the individual cleaning sessions.

5. The method according to claim 1, wherein the variation represents average variation for a plurality of previous time periods.

6. The method according to claim 1 wherein the time period is one day.

7. The method according to claim 1, wherein the adjusting comprises adjusting the cleaning schedule, such that during one time period, cleaning is performed more frequently during a first time interval corresponding to a first average load, than during a second time interval corresponding to a second average load, wherein the first average load is greater than the second average load.

8. The method according to claim 1, further comprising estimating, based on the monitored load quantity, a material accumulation rate pattern representing a material accumulation rate along the predefined path, and wherein adjusting the cleaning schedule is based on the estimated material accumulation rate pattern.

9. The method according to claim 8, wherein the material accumulation rate pattern is based on an estimated material accumulation rate during individual cleaning sessions.

10. The method according to claim 9, wherein the adjusting comprises predicting one or more points in time when an accumulated material value of the accumulated material pattern will reach an accumulation target, and setting timing of an individual cleaning session to the predicted one or more points in time.

11. The method according to claim 10, wherein the accumulation target is determined based on at least one of: cleanliness of the predefined path, an amount of energy required for cleaning the predefined path, and an animal disturbance factor.

12. The method according to claim 10, wherein the method comprises: obtaining user input indicative of a desired cleanliness level and adjusting the accumulation target based on the obtained cleanliness level.

13. The method according to claim 1, further comprising: predicting, based on the monitored load quantity, a future material accumulation rate along the predefined path, and adjusting the cleaning schedule, based on the predicted future material accumulation rate along the predefined path.

14. The method according to claim 1,
   wherein the monitored load quantity comprises an estimated offset load and a variable load representing the amount of moved material, wherein the method comprises monitoring the load quantity during one or more calibration sessions when the scraper arrangement is cleaning the predefined path while the predefined path is determined to be clean, and estimating the offset load based on the monitored load quantity during the one or more calibration sessions.

15. The method according to claim 1, wherein the cleaning schedule defines timings for operating the scraper arrangement during one day.

16. The method according to claim 1, wherein the load quantity comprises at least one of; power consumption, energy consumption or current consumption of a motor operating the scraper arrangement, mechanical load or tension in the driving mechanism, and pressure of a hydraulic arrangement operating the scraper arrangement.

17. A non-transitory computer-readable data carrier having stored thereon a computer program product comprising instructions which, when the program product is executed by a computer, causes the computer to carry out the method according to claim 1.

18. A control arrangement for autonomously operating a scraper arrangement for adjusting a cleaning schedule of a cleaning session of the scraper arrangement, wherein the scraper arrangement comprises a scraper and a load sensor and is arranged for removing manure in a livestock area; wherein one cleaning session comprises one cleaning along a predefined path in the livestock area;

the control arrangement being configured to:
monitor by the load sensor, while performing cleaning sessions in accordance with the cleaning schedule, a load quantity representing an amount of material moved by the scraper arrangement;
adjust the cleaning schedule automatically, based on a variation in the monitored load quantity among the monitored cleaning sessions such that the variation in the monitored load quantity among the individual cleaning sessions is reduced,
wherein the variation represents a variation among load quantities monitored during different cleaning sessions within one time period; and
automatically operate, by the control arrangement, the scraper arrangement according to the adjusted cleaning schedule.

19. A scraper arrangement comprising:
a scraper arranged to remove material along a predefined path, a load sensor arranged to monitor a load quantity, and the control arrangement according to claim 18.

* * * * *